(12) United States Patent
Starks

(10) Patent No.: US 11,230,265 B2
(45) Date of Patent: Jan. 25, 2022

(54) WINDOW WIPING ASSEMBLY

(71) Applicant: Robert Starks, Los Angeles, CA (US)

(72) Inventor: Robert Starks, Los Angeles, CA (US)

( * ) Notice: Subject to any disclaimer, the term of this patent is extended or adjusted under 35 U.S.C. 154(b) by 78 days.

(21) Appl. No.: 16/738,397

(22) Filed: Jan. 9, 2020

(65) Prior Publication Data
US 2021/0213912 A1    Jul. 15, 2021

(51) Int. Cl.
*B60S 1/04*    (2006.01)
*B60S 1/38*    (2006.01)
*B60S 1/56*    (2006.01)

(52) U.S. Cl.
CPC ............. *B60S 1/0411* (2013.01); *B60S 1/043* (2013.01); *B60S 1/0466* (2013.01); *B60S 1/38* (2013.01); *B60S 1/566* (2013.01)

(58) Field of Classification Search
CPC ...... B60S 1/0466; B60S 1/0411; B60S 1/566; B60S 1/583; B60S 1/38; B60S 1/043; B60R 13/043; B60J 5/0402; B60J 5/0405
USPC ....... 15/250.1; 296/93; 49/377, 496.1, 477.1
See application file for complete search history.

(56) References Cited

U.S. PATENT DOCUMENTS

| | | | | |
|---|---|---|---|---|
| 2,563,252 A * | 8/1951 | Larsen | ................ | B60J 10/75 49/490.1 |
| 2,690,350 A * | 9/1954 | Shapiro | ................ | B60J 10/75 296/153 |
| 2,704,689 A * | 3/1955 | Shapiro | ................ | B60J 10/75 296/153 |
| 3,686,705 A * | 8/1972 | Parker | ................ | B60S 1/583 15/250.01 |
| 3,871,049 A | 3/1975 | Workman | | |
| 5,085,005 A | 2/1992 | Yasukawa | | |
| 5,253,453 A * | 10/1993 | Maass | ................ | B60J 10/75 49/377 |
| 5,339,488 A | 8/1994 | Maass | | |
| D587,185 S | 2/2009 | Baker | | |
| 7,941,890 B1 | 5/2011 | Alexander | | |
| 9,669,806 B2 * | 6/2017 | Phillip | ................ | B60J 10/34 |
| 2015/0082572 A1 | 3/2015 | Kim | | |

\* cited by examiner

*Primary Examiner* — Gary K. Graham

(57) ABSTRACT

A window wiping assembly for removing moisture and debris from a side window of a vehicle includes a positioning element that is mountable to an exterior surface of a vehicle door having a window opening positioned therein. The positioning element extends substantially between opposed endpoints of a lower edge of the window opening. A wiper blade is engaged to and extends from an inner face of the positioning element so that an outer edge of the wiper blade contacts an exterior face of a window that is positioned in the window opening. The wiper blade extends substantially between opposed ends of the positioning element. The wiper blade removes moisture and debris from the exterior face of the window as the window is raised and lowered within the window opening.

13 Claims, 3 Drawing Sheets

WINDOW WIPING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to window wiping assemblies and more particularly pertains to a new window wiping assembly for removing moisture and debris from a side window of a vehicle.

(2) Description of Related Art Including Information Disclosed Under 37 CFR 1.97 and 1.98

The prior art relates to window wiping assemblies. Prior art window wiping assemblies may comprise a wiper blade that is selectively positionable against a sliding window as the sliding window is biased between a closed configuration and an open configuration.

BRIEF SUMMARY OF THE INVENTION

An embodiment of the disclosure meets the needs presented above by generally comprising a positioning element that is configured to be mountable to an exterior surface of a vehicle door having a window opening positioned therein. The positioning element extends substantially between opposed endpoints of a lower edge of the window opening. A wiper blade is engaged to and extends from an inner face of the positioning element so that an outer edge of the wiper blade contacts an exterior face of a window that is positioned in the window opening. The wiper blade extends substantially between opposed ends of the positioning element. The wiper blade is configured to remove moisture and debris from the exterior face of the window as the window is raised and lowered within the window opening.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
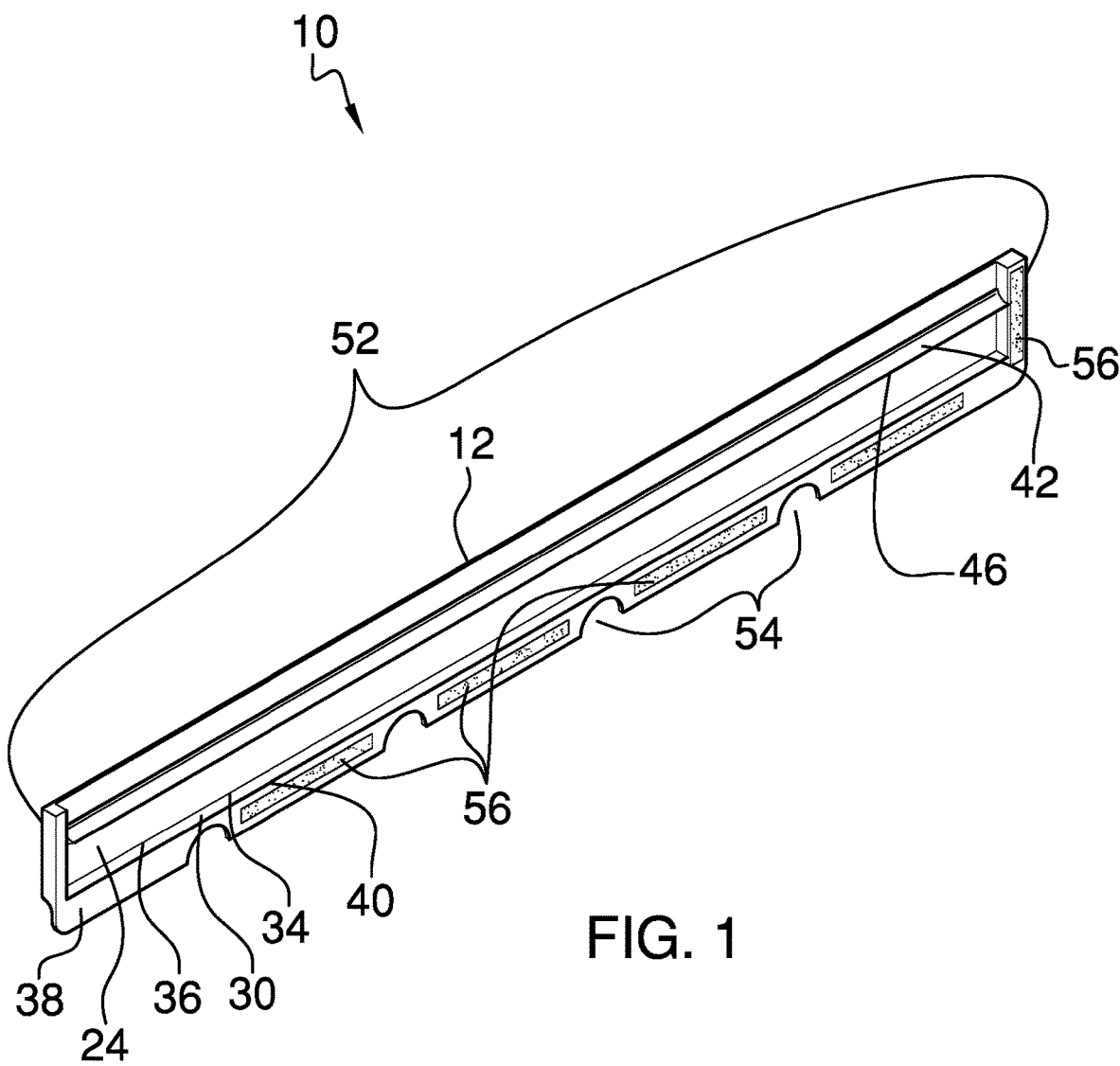
FIG. 1 is an isometric perspective view of a window wiping assembly according to an embodiment of the disclosure.

With reference now to the drawings, and in particular to FIGS. 1 through 4 thereof, a new window wiping assembly embodying the principles and concepts of an embodiment of the disclosure and generally designated by the reference numeral 10 will be described.

As best illustrated in FIGS. 1 through 4, the window wiping assembly 10 generally comprises a positioning element 12 that is configured to be mountable to an exterior surface 14 of a vehicle door 16 having a window opening 18 positioned therein. The positioning element 12 extends substantially between opposed endpoints 20 of a lower edge 22 of the window opening 18.

The positioning element 12 comprises a first plate 24, which is elongated rectangularly shaped. Each of a pair of bars 26 is coupled to the first plate 24 and extends along a respective opposing end 28 of the first plate 24. One of the bars 26 may be dimensionally wider than the other of the bars 26, although the present invention also anticipates the bars 26 being dimensionally equivalent.

A second plate 30 is coupled to and extends between lower limits 32 of the bars 26. The second plate 30 has a first edge 34 that is coupled to a lower end 36 of the first plate 24. The second plate 30 and the pair of bars 26 together serve to rigidify the first plate 24. A lip 38 is coupled to extends from a second edge 40 of the second plate 30 and between the bars 26. The lip 38 extends opposingly from the second plate 30 relative to the first plate 24.

Figure 4:
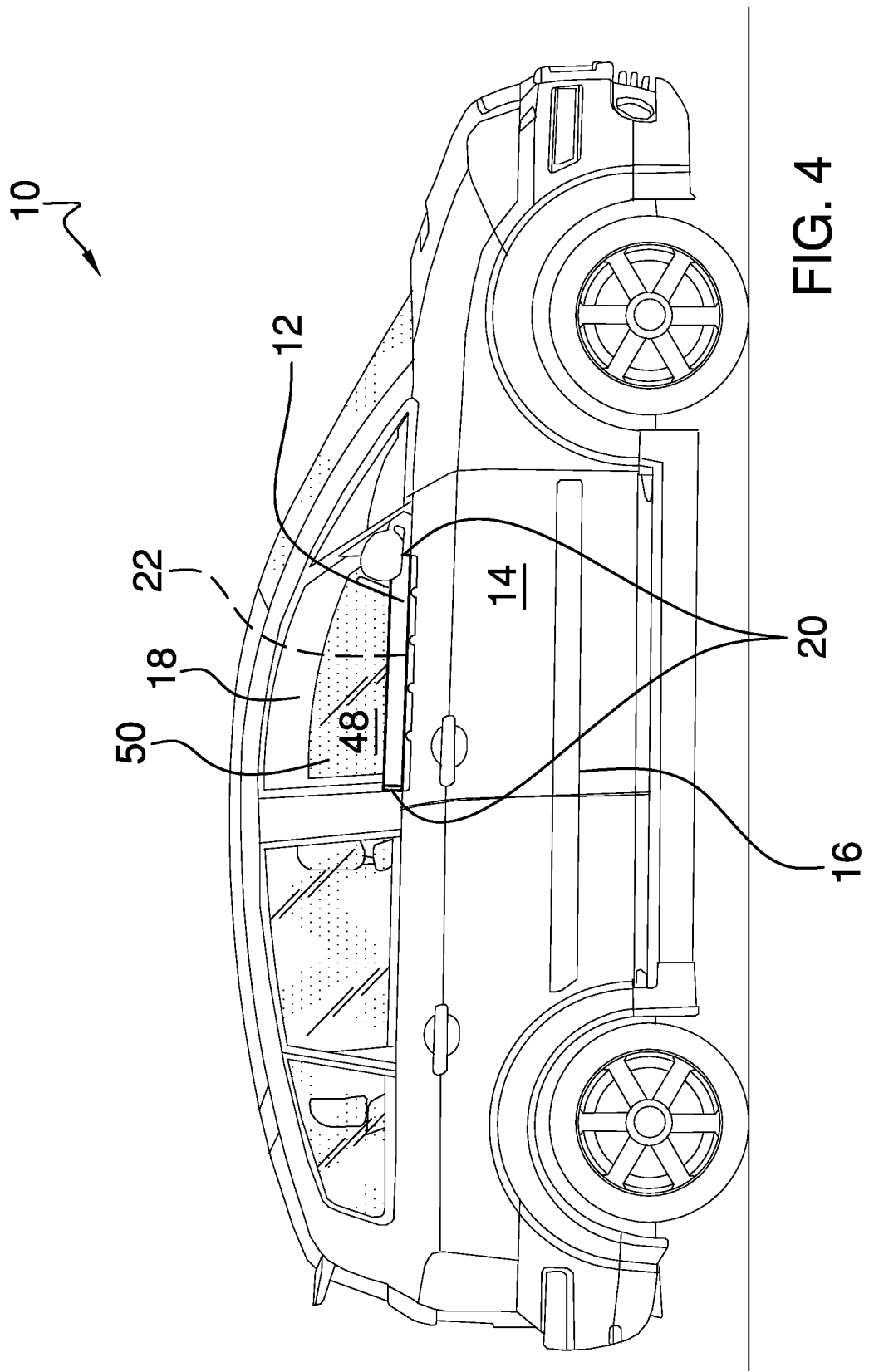
FIG. 4 is an in-use view of an embodiment of the disclosure.

A wiper blade 42 is engaged to and extends from an inner face 44 of the positioning element 12 so that an outer edge 46 of the wiper blade 42 contacts an exterior face 48 of a window 50 that is positioned in the window opening 18. The wiper blade 42 extends substantially between opposed ends of the positioning element 12. The wiper blade 42 is configured to remove moisture and debris from the exterior face 48 of the window 50 as the window 50 is raised and lowered within the window opening 18. The assembly 10 is anticipated to be useful in removing water, snow, frost, other debris from a window 50 that is positioned in a vehicle door 16, such as a driver side door and a passenger side door, as shown in FIG. 4. Maintaining the window 50 free of moisture and debris increases visibility for a driver and enhances safe driving.

Figure 2:
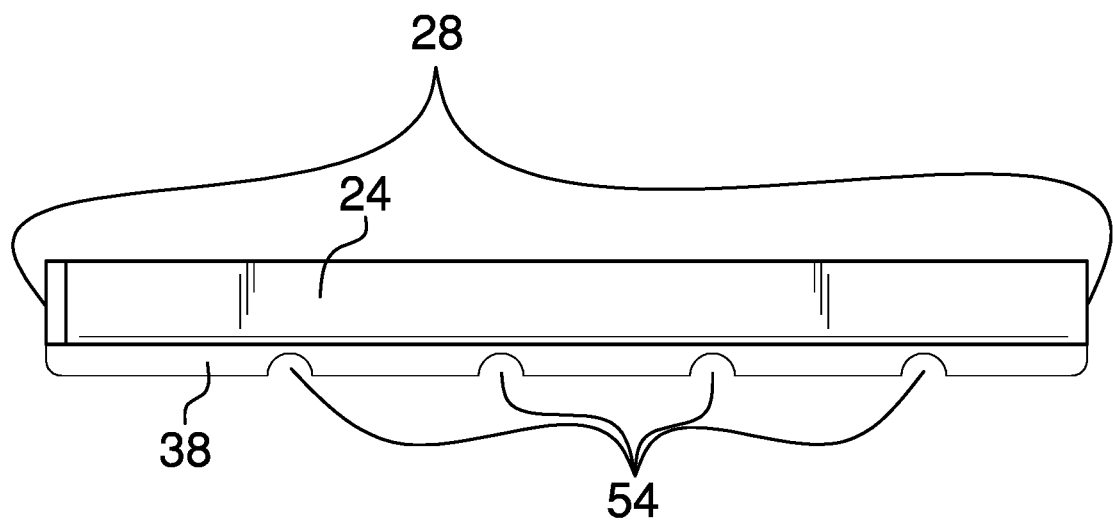
FIG. 2 is a back view of an embodiment of the disclosure.
Figure 3:
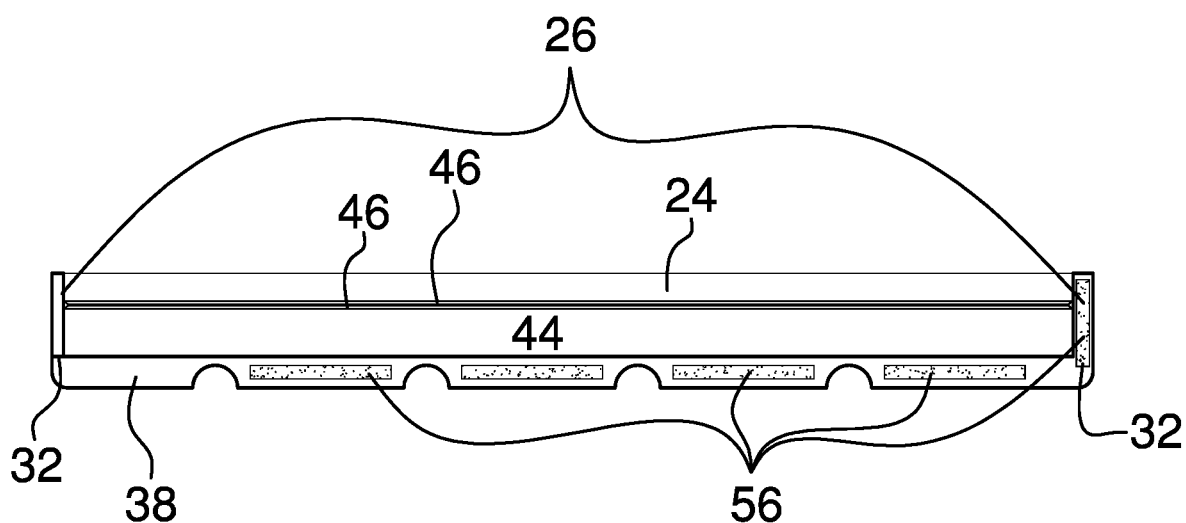
FIG. 3 is a front view of an embodiment of the disclosure.

The wiper blade 42 may comprise rubber, or other resiliently flexible material, such as, but not limited to, silicone, elastomer, and the like. The lip 38 may have a plurality of cutouts 54 positioned therein, as shown in FIGS. 2 and 3, which would aid in draining fluid that collects between the positioning element 12 and the window 50.

A plurality of couplers 56 is engaged to the inner face 44 of the positioning element 12 and is configured to selectively engage to the exterior surface 14 of the door 16. The couplers 56 are configured to removably couple the positioning element 12 to the door 16. The plurality of couplers 56 comprises couplers 56 that are engaged to the lip 38, as shown in FIG. 3. The plurality of couplers 56 also may comprise a coupler 56 engaged to the one of the bars 26 that is dimensionally wider, as shown in FIG. 3, wherein the coupler 56 is configured to engage a substantially vertical framing element of the window opening 18. The couplers 56 may comprise adhesive, or other coupling means, such as, but not limited to, hook and loop fasteners, magnets, suction cups, and the like.

In use, the couplers 56 are engaged to the exterior surface 14 of the door 16, by application of pressure to the lip 38 and to the one of the bars 26 that is dimensionally wider, to mount the positioning element 12 to the vehicle door 16. The outer edge 46 of the wiper blade 42 contacts and removes moisture from the exterior face 48 of the window 50 as the window 50 is raised and lowered within the window opening 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A window wiping assembly comprising:
   a positioning element configured to be mountable to an exterior surface of a vehicle door having a window opening positioned therein such that the positioning element extends substantially between opposed endpoints of a lower edge of the window opening;
   a wiper blade engaged to and extending from an inner face of the positioning element such that an outer edge of the wiper blade contacts an exterior face of a window positioned in the window opening, the wiper blade extending substantially between opposed ends of the positioning element wherein the wiper blade is configured for removing moisture and debris from the exterior face of the window as the window is raised and lowered within the window opening; and
   wherein the positioning element comprises
      a first plate, the first plate being elongated rectangularly shaped,
      a pair of bars, each bar being coupled to the first plate and extending along a respective opposing end of the first plate,
      a second plate coupled to and extending between lower limits of the bars, the second plate having a first edge coupled to a lower end of the first plate, and
      a lip coupled to extending from a second edge of the second plate and between the bars such that the lip extends opposingly from the second plate relative to the first plate.

2. The window wiping assembly of claim 1, wherein one of the bars is dimensionally wider than the other of the bars.

3. The window wiping assembly of claim 2, further including a plurality of couplers, respective couplers being engaged to the lip and to the one of the bars that is dimensionally wider, the couplers being configured for selectively engaging to the exterior surface of the vehicle door wherein the couplers are configured for removably coupling the positioning element to the vehicle door.

4. The window wiping assembly of claim 1, wherein the lip has a plurality of cutouts positioned therein.

5. The window wiping assembly of claim 1, wherein the wiper blade comprises rubber.

6. The window wiping assembly of claim 1, further including a plurality of couplers engaged to the inner face of the positioning element and being configured for selectively engaging to the exterior surface of the vehicle door wherein the couplers are configured for removably coupling the positioning element to the vehicle door.

7. The window wiping assembly of claim 6, wherein the couplers comprise adhesive.

8. The window wiping assembly of claim 1, further including a plurality of couplers engaged to the lip being configured for selectively engaging to the exterior surface of the vehicle door wherein the couplers are configured for removably coupling the positioning element to the vehicle door.

9. A window wiping assembly and vehicle door combination comprising:
   a vehicle door having a window opening positioned therein;
   a window selectively slidably positionable within the window opening;
   a positioning element mounted to an exterior surface of the vehicle door proximate to a lower edge of the window opening such that the positioning element extends substantially between opposed endpoints of the lower edge;
   a wiper blade engaged to and extending from an inner face of the positioning element such that an outer edge of the wiper blade contacts an exterior face of the window, the wiper blade extending substantially between opposed ends of the positioning element wherein the wiper blade is configured for removing moisture and debris from the exterior face of the window as the window is raised and lowered within the window opening; and
   wherein the positioning element comprises
      a first plate, the first plate being elongated rectangularly shaped, a pair of bars, each bar being coupled to the first plate and extending along a respective opposing end of the first plate, a second plate coupled to and extending between lower limits of the bars, the second plate having a first edge coupled to a lower end of the first plate, and a lip coupled to extending from a second edge of the second plate and between the bars such that the lip extends opposingly from the second plate relative to the first plate.

10. The window wiping assembly of claim 9, wherein one of the bars is dimensionally wider than the other of the bars.

11. The window wiping assembly of claim 9, wherein the lip has a plurality of cutouts positioned therein.

12. The window wiping assembly of claim 9, wherein the wiper blade comprises rubber.

13. A window wiping assembly comprising:

a positioning element configured to be mountable to an exterior surface of a vehicle door having a window opening positioned therein such that the positioning element extends substantially between opposed endpoints of a lower edge of the window opening, the positioning element comprising:

a first plate, the first plate being elongated rectangularly shaped, a pair of bars, each bar being coupled to the first plate and extending along a respective opposing end of the first plate, one of the bars being dimensionally wider than the other of the bars, a second plate coupled to and extending between lower limits of the bars, the second plate having a first edge coupled to a lower end of the first plate, and a lip coupled to extending from a second edge of the second plate and between the bars such that the lip extends opposingly from the second plate relative to the first plate, the lip having a plurality of cutouts positioned therein;

a wiper blade engaged to and extending from an inner face of the positioning element such that an outer edge of the wiper blade contacts an exterior face of a window positioned in the window opening, the wiper blade extending substantially between opposed ends of the positioning element wherein the wiper blade is configured for removing moisture and debris from the exterior face of the window as the window is raised and lowered within the window opening, the wiper blade comprising rubber; and a plurality of couplers engaged to the inner face of the positioning element and being configured for selectively engaging to the exterior surface of the vehicle door wherein the couplers are configured for removably coupling the positioning element to the vehicle door, the plurality of couplers comprising couplers engaged to the lip, the plurality of couplers comprising a coupler engaged to the one of the bars that is dimensionally wider wherein the coupler is configured for coupling to a substantially vertical framing element of the window opening, the couplers comprising adhesive.

\* \* \* \* \*